US012670715B2

(12) United States Patent
Wu et al.

(10) Patent No.: US 12,670,715 B2
(45) Date of Patent: Jun. 30, 2026

(54) SYSTEMS AND METHODS FOR VIDEO ANALYSIS

(71) Applicant: ZHEJIANG DAHUA TECHNOLOGY CO., LTD., Hangzhou (CN)

(72) Inventors: Chenglu Wu, Hangzhou (CN); Yanxun Yu, Hangzhou (CN); Zhen Zhang, Hangzhou (CN); Yayun Wang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 278 days.

(21) Appl. No.: 18/396,640

(22) Filed: Dec. 26, 2023

(65) Prior Publication Data

US 2024/0135710 A1 Apr. 25, 2024

Related U.S. Application Data

(63) Continuation of application No. PCT/CN2021/127622, filed on Oct. 29, 2021.

(30) Foreign Application Priority Data

Jul. 5, 2021 (CN) .......................... 202110758806.7

(51) Int. Cl.
*G06V 20/40* (2022.01)
*G06V 10/774* (2022.01)
*G06V 10/776* (2022.01)

(52) U.S. Cl.
CPC ............ *G06V 20/46* (2022.01); *G06V 10/774* (2022.01); *G06V 10/776* (2022.01); *G06V 20/41* (2022.01); *G06V 20/44* (2022.01)

(58) Field of Classification Search
CPC .... G06V 20/46; G06V 10/774; G06V 10/776; G06V 20/41; G06V 20/44; G06V 10/82;
(Continued)

(56) References Cited

U.S. PATENT DOCUMENTS 11,210,775 B1* 12/2021 Wu .......................... G06N 3/094
2011/0292288 A1 12/2011 Deever
(Continued)

FOREIGN PATENT DOCUMENTS

CN 105809954 A 7/2016
CN 106796754 A 5/2017
(Continued)

OTHER PUBLICATIONS

English translation of CN112418012 (Year: 2021).*
(Continued)

*Primary Examiner* — Wassim Mahrouka
(74) *Attorney, Agent, or Firm* — Metis IP LLC

(57) ABSTRACT

The present disclosure relates to systems and methods for video analysis. The systems may obtain a video stream. For each of a plurality of frames in the video stream, the systems may determine a reference score corresponding to the frame based on a spatiotemporal feature of the frame. The spatiotemporal feature of the frame may associate a feature of the frame with a feature of at least one adjacent frame of the frame. The systems may determine, from the plurality of frames in the video stream, one or more target frames based on reference scores corresponding to the plurality of frames.

14 Claims, 12 Drawing Sheets

<u>300</u>

(58) Field of Classification Search
CPC ........ G06V 20/54; G06N 3/0442; G06N 3/09;
G06N 3/044; G06N 3/08; G06F 18/2414;
G06F 18/22
See application file for complete search history.

(56) References Cited

U.S. PATENT DOCUMENTS

| | | |
|---|---|---|
| 2019/0188482 A1 | 6/2019 | Knittel |
| 2023/0306236 A1 | 9/2023 | Sun |

FOREIGN PATENT DOCUMENTS

| | | |
|---|---|---|
| CN | 108156520 A | 6/2018 |
| CN | 110287374 A | 9/2019 |
| CN | 110458013 A | 11/2019 |
| CN | 111241343 A | 6/2020 |
| CN | 112016500 A | 12/2020 |
| CN | 112084928 A | 12/2020 |
| CN | 112084963 A | 12/2020 |
| CN | 112200067 A | 1/2021 |
| CN | 112231516 A | 1/2021 |
| CN | 112418012 A | 2/2021 |
| CN | 112435470 A | 3/2021 |
| CN | 112528801 A | 3/2021 |
| CN | 112836676 A | 5/2021 |
| CN | 113038261 A | 6/2021 |
| JP | 2018170003 A | 11/2018 |

OTHER PUBLICATIONS

International Search Report in PCT/CN2021/127622 mailed on Apr. 6, 2022, 5 pages.
Written Opinion in PCT/CN2021/127622 mailed on Apr. 6, 2022, 4 pages.
Ai, Xin, The Technology and Implementation of Video Summarization Based on Content Analysis, China Excellent Master's Dissertation Full-Text Database Information Technology Series, 2020, 72 pages.
Keval Dishi et al., Fast Unsupervised Anomaly detection in Traffic Videos, 2020 IEEE/CVF Conference on Computer Vision and Pattern Recognition Workshops (CVPRW), 2658-2664, 2020.
First Office Action in Chinese Application 202110758806.7 mailed on Jul. 12, 2024, 16 pages.
The Office Action in Singapore Application No. 11202309837X mailed on Sep. 20, 2025, 9 pages.

* cited by examiner

<u>100</u>

130

130-1  130-2  130-3

120

Network

140

Storage
Device 112  110

<u>300</u>

| Obtaining a video stream | 310 |

| For each of a plurality of frames in the video stream, determining a reference score corresponding to the frame based on a spatiotemporal feature of the frame | 320 |

| Determining, from the plurality of frames in the video stream, one or more target frames based on reference scores corresponding to the plurality of frames | 330 |

410

Frame A Frame B

Frame C Frame D

900

Obtaining a plurality of sample video streams — 910

Determining the video analysis network by training a preliminary video analysis network based on a plurality of labeled sample video streams — 920

1000

For each of a plurality of frames in a video stream, a reference score corresponding to the frame is larger than a first threshold? — 1010

Yes

Determining a similarity degree between the frame and a previous frame of the frame — 1020

The similarity degree is less than a second threshold — 1030

Yes

Designating the frame as a target frame — 1040

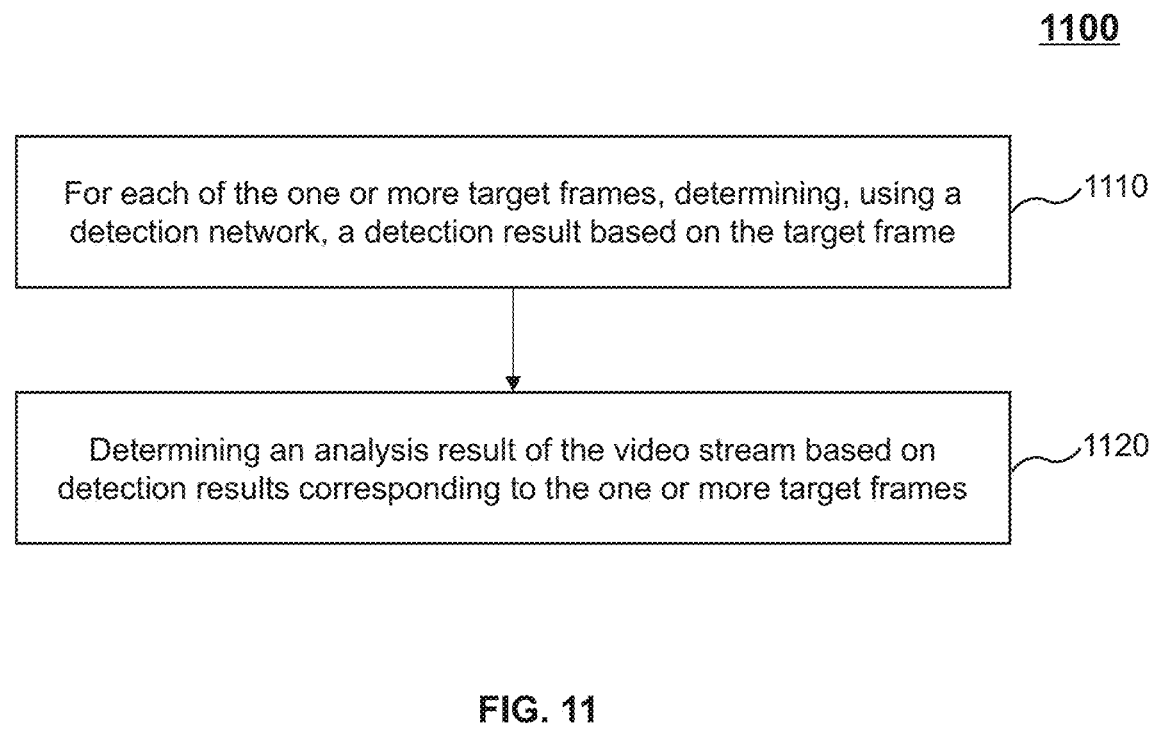

1100

For each of the one or more target frames, determining, using a detection network, a detection result based on the target frame — 1110

Determining an analysis result of the video stream based on detection results corresponding to the one or more target frames — 1120

FIG. 11

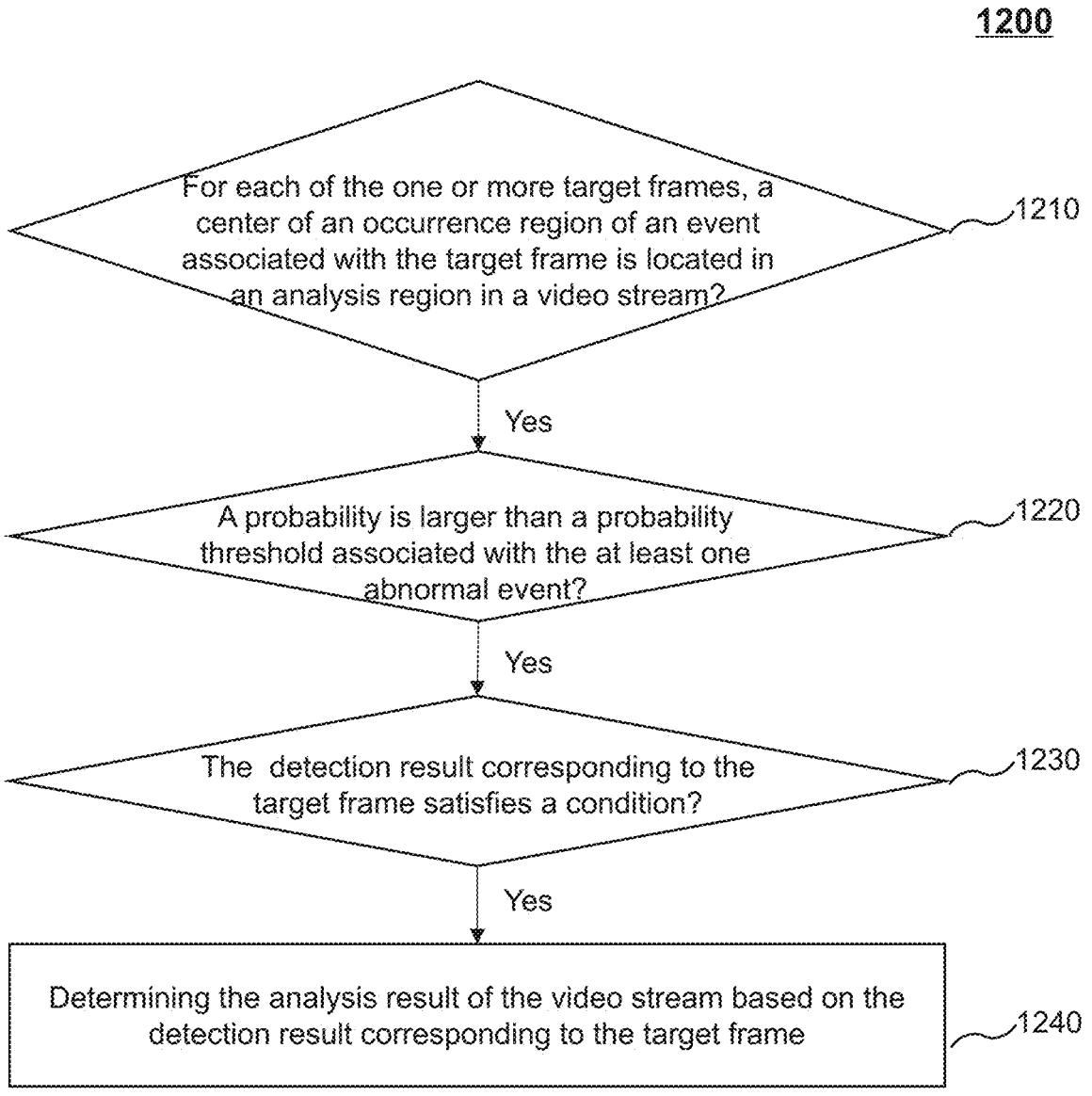

1200

For each of the one or more target frames, a center of an occurrence region of an event associated with the target frame is located in an analysis region in a video stream? — 1210

Yes

A probability is larger than a probability threshold associated with the at least one abnormal event? — 1220

Yes

The detection result corresponding to the target frame satisfies a condition? — 1230

Yes

Determining the analysis result of the video stream based on the detection result corresponding to the target frame — 1240

FIG. 12

SYSTEMS AND METHODS FOR VIDEO ANALYSIS

CROSS-REFERENCE TO RELATED APPLICATIONS

This application is a continuation of International Application No. PCT/CN2021/127622, filed on Oct. 29, 2021, which claims priority to Chinese Patent Application No. 202110758806.7 filed on Jul. 5, 2021, the contents of which are incorporated herein by reference in their entirety.

TECHNICAL FIELD

The present disclosure generally relates to monitoring technology, and in particular, to systems and methods for video analysis.

BACKGROUND

With the development of communication and multimedia technologies, monitoring devices are widely used to monitor traffic abnormal events (e.g., cargo throwing, traffic accidents, smoke, fire, and agglomerate fog, road construction, etc.) in a transportation field. Commonly, the detection and analysis of traffic abnormal events rely on human observation. It is difficult for humans to analyze a large number of monitoring scenes at the same time, which leads to an inefficient analysis of the traffic abnormal events and inability to accurately identify the traffic abnormal events from the monitoring scenes. Therefore, it is desirable to provide systems and methods for video analysis, thereby improving the efficiency and accuracy of the analysis of the traffic abnormal event.

SUMMARY

An aspect of the present disclosure relates to a method for video analysis. The method may include obtaining a video stream. The method may include determining, for each of a plurality of frames in the video stream, a reference score corresponding to the frame based on a spatiotemporal feature of the frame. The spatiotemporal feature of the frame may associate a feature of the frame with a feature of at least one adjacent frame of the frame. The method may further include determining, from the plurality of frames in the video stream, one or more target frames based on reference scores corresponding to the plurality of frames.

In some embodiments, the determining, for each of the plurality of frames in the video stream, the reference score corresponding to the frame based on the spatiotemporal feature of the frame may include determining, using a video analysis model, the reference score corresponding to the frame based on the spatiotemporal feature of the frame. The video analysis model may be a trained machine learning model.

In some embodiments, the video analysis model may include a video analysis network. The video analysis network may include a feature extraction layer, a feature association layer, and a prediction layer. The feature extraction layer may be configured to extract features of the plurality of frames in the video stream. The feature association layer may be configured to determine the spatiotemporal feature of the frame by associating the feature of the frame with the feature of the at least one adjacent frame of the frame. The prediction layer configured to determine the reference score corresponding to the frame based on the spatiotemporal feature of the frame.

In some embodiments, the video analysis model may further include a plurality of cache units. Each of the plurality of cache units may be connected to the video analysis network and configured to cache a same number of frames as a number of frames that are inputted into the video analysis network in a single processing of the video analysis network.

In some embodiments, the video analysis network is obtained by a training process. The training process may include obtaining a plurality of sample video streams. Each of the plurality of sample video streams may involve an abnormal event and include at least one first frame corresponding to a moment of the abnormal event and a plurality of second frames corresponding to other moments. The training process may include labeling, for each of the plurality of sample video streams, a plurality of sample frames in the sample video stream. The at least one first frame may be labeled with a first score. Each of the plurality of second frames may be labeled with a second score. The second score may be determined based on a similarity between the at least one first frame and the second frame. The training process may further include determining the video analysis network by training a preliminary video analysis network based on the plurality of labeled sample video streams.

In some embodiments, the determining the video analysis network by training the preliminary video analysis network based on the plurality of labeled sample video streams may include determining, for each of the plurality of labeled sample video streams, using the preliminary video analysis network, a prediction score corresponding to each sample frame in the labeled sample video stream; determining a loss function based on prediction scores and the labeled scores corresponding to the plurality of sample frames in the labeled sample video stream; and determining the video analysis network by training the preliminary video analysis network based on the plurality of labeled sample video streams and corresponding values of the loss function.

In some embodiments, the determining the loss function based on prediction scores and the labeled scores corresponding to the plurality of sample frames in the labeled sample video stream may include determining, for each pair of adjacent sample frames in the plurality of sample frames, a first difference of prediction scores corresponding to the pair of adjacent sample frames and a second difference of labeled scores corresponding to the pair of adjacent sample frames; determining a deviation term based on first differences and second differences corresponding to multiple pairs of adjacent sample frames in the plurality of sample frames; and determining the loss function based on the deviation term.

In some embodiments, the video analysis network is obtained by a training process. The training process may include constructing the feature extraction layer in the video analysis network by a transfer learning and determining the feature association layer and the prediction layer by training a preliminary feature association layer and a preliminary prediction layer based on a plurality of labeled sample video streams.

In some embodiments, the determining, for each of the plurality of frames in the video stream, the reference score corresponding to the frame based on the spatiotemporal feature of the frame may include determining an analysis region in the video stream, and determining, for each of the plurality of frames in the video stream, the reference score corresponding to the frame based on the spatiotemporal feature of a portion of the frame in the analysis region.

In some embodiments, the determining, from the plurality of frames in the video stream, the one or more target frames based on the reference scores corresponding to the plurality of frames may include for each of the plurality of frames in the video stream, determining whether the reference score corresponding to the frame is larger than a first threshold; in response to determining that the reference score corresponding to the frame is larger than the first threshold, determining a similarity degree between the frame and a previous frame of the frame; determining whether the similarity degree is less than a second threshold; and in response to determining that the similarity degree is less than the second threshold, designating the frame as a target frame.

In some embodiments, the method may further include for each of the one or more target frames, determining, using a detection model, a detection result based on the target frame. The detection result may include at least one of an occurrence region, in the target frame, of an event involved in the target frame or a probability that a type of the event is the same as a type of at least one abnormal event. The method may further include determining an analysis result of the video stream based on detection results corresponding to the one or more target frames.

In some embodiments, the determining the analysis result of the video stream based on the detection results corresponding to the one or more target frames may include for each of the one or more target frames, determining whether a center of the occurrence region of the event associated with the target frame is located in an analysis region in the video stream; in response to determining that the center of the occurrence region of the event associated with the target frame is located in the analysis region in the video stream, determining whether the probability is larger than a probability threshold associated with the at least one abnormal event; in response to determining that the probability is larger than the probability threshold associated with the at least one abnormal event, determining whether the occurrence region of the event associated with the target frame satisfies a condition; and in response to determining that the detection result corresponding to the target frame satisfies the condition, determining the analysis result of the video stream based on the detection result corresponding to the target frame.

In some embodiments, the condition may include an intersection-over-union (IOU) of the occurrence region of the event in the detection result corresponding to the target frame and an occurrence region of the event in a candidate detection result in the detection results corresponding to the one or more target frames is less than a third threshold. The candidate detection result may be determined before the detection result and a probability in the candidate detection result may be same as the probability in the detection result. The condition may include an interval between the target frame corresponding to the detection result and a target frame corresponding to a previous detection result of the detection result is larger than an interval threshold.

A further aspect of the present disclosure relates to a system for video analysis. The system may include at least one storage device including a set of instructions and at least one processor in communication with the at least one storage device. When executing the set of instructions, the at least one processor may be directed to cause the system to implement operations. The operations may include obtaining a video stream. The operations may include determining, for each of a plurality of frames in the video stream, a reference score corresponding to the frame based on a spatiotemporal feature of the frame. The spatiotemporal feature of the frame may associate a feature of the frame with a feature of at least one adjacent frame of the frame. The operations may further include determining, from the plurality of frames in the video stream, one or more target frames based on reference scores corresponding to the plurality of frames.

A still further aspect of the present disclosure relates to a system for video analysis. The system may include an obtaining module, a first determination module, and a second determination module. The obtaining module may be configured to obtain a video stream. The first determination module may be configured to determine, for each of a plurality of frames in the video stream, a reference score corresponding to the frame based on a spatiotemporal feature of the frame. The spatiotemporal feature of the frame may associate a feature of the frame with a feature of at least one adjacent frame of the frame. The second determination module may be configured to determine, from the plurality of frames in the video stream, one or more target frames based on reference scores corresponding to the plurality of frames.

A still further aspect of the present disclosure relates to a non-transitory computer readable medium including executable instructions. When the executable instructions are executed by at least one processor, the executable instructions may direct the at least one processor to perform a method. The method may include determining, for each of a plurality of frames in the video stream, a reference score corresponding to the frame based on a spatiotemporal feature of the frame. The spatiotemporal feature of the frame may associate a feature of the frame with a feature of at least one adjacent frame of the frame. The method may further include determining, from the plurality of frames in the video stream, one or more target frames based on reference scores corresponding to the plurality of frames.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 11 is a flowchart illustrating an exemplary process for determining an analysis result of a video stream according to some embodiments of the present disclosure; and FIG. 12 is a flowchart illustrating an exemplary process for determining an analysis result of a video stream according to some embodiments of the present disclosure.

DETAILED DESCRIPTION

Figure 1:
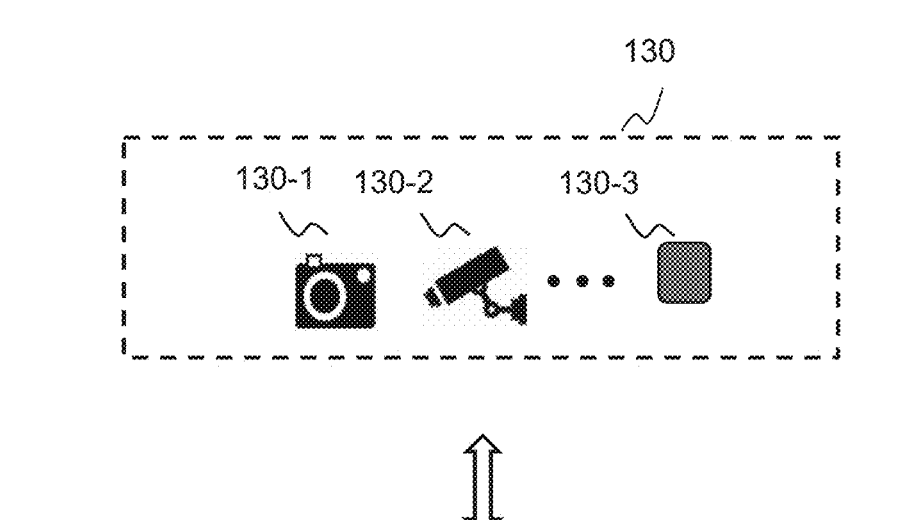
FIG. 1 is a schematic diagram illustrating an exemplary video analysis system according to some embodiments of the present disclosure.
Figure 1:
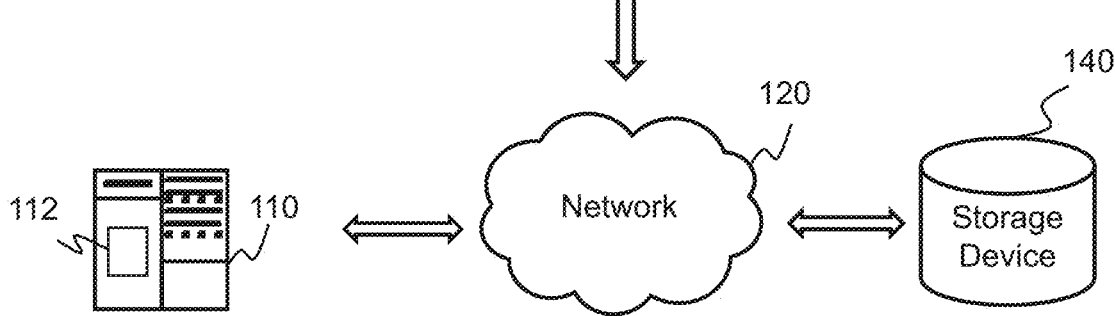

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for video analysis. The systems may obtain a video stream (e.g., a video stream associated with a transportation scene). For each of a plurality of frames in the video stream, the systems may determine a reference score corresponding to the frame based on a spatiotemporal feature of the frame. The spatiotemporal feature of the frame may associate a feature of the frame with a feature of at least one adjacent frame of the frame. According to reference scores corresponding to the plurality of frames, the systems may determine one or more target frames from the plurality of frames in the video stream. The one or more target frames may involve an event (e.g., a traffic event). Further, for each of the one or more target frames, the systems may determine a detection result based on the target frame using a detection model. According to detection results corresponding to the one or more target frames, the systems may determine an analysis result (e.g., a type of the event, an occurrence region of the event) of the video stream.

FIG. 1 is a schematic diagram illustrating an exemplary video analysis system according to some embodiments of the present disclosure. In some embodiments, the video analysis system 100 may be applied in various application scenarios, such as traffic monitoring, security monitoring, etc. As shown, the video analysis system 100 may include a server 110, a network 120, an acquisition device 130, and a storage device 140.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130 and/or the storage device 140 via the network 120. As another example, the server 110 may be directly connected to the acquisition device 130 and/or the storage device 140 to access stored information and/or data.

In some embodiments, the server 110 may include a processing device 112. The processing device 112 may process information and/or data relating to the video analysis to perform one or more functions described in the present disclosure. For example, the processing device 112 may obtain a video stream. For each of a plurality of frames in the video stream, the processing device 112 may determine a reference score corresponding to the frame based on a spatiotemporal feature of the frame. Further, the processing device 112 may determine, from the plurality of frames in the video stream, one or more target frames based on reference scores corresponding to the plurality of frames.

In some embodiment, the server 110 may be unnecessary and all or part of the functions of the server 110 may be implemented by other components (e.g., the acquisition device 130) of the video analysis system 100. For example, the processing device 112 may be integrated into the acquisition device 130 and the functions (e.g., video analysis) of the processing device 112 may be implemented by the acquisition device 130.

The network 120 may facilitate exchange of information and/or data for the video analysis system 100. In some embodiments, one or more components (e.g., the server 110, the acquisition device 130, the storage device 140) of the video analysis system 100 may transmit information and/or data to other component(s) of the video analysis system 100 via the network 120. For example, the server 110 may obtain the video stream from the acquisition device 130 via the network 120. As another example, the server 110 may transmit the video stream and/or the one or more target frames to an external device via the network 120. In some embodiments, one or more components (e.g., the server 110, the acquisition device 130, the storage device 140) of the video analysis system 100 may communicate information and/or data with one or more external resources such as an external database of a third party, etc. For example, the server 110 may obtain a model (e.g., a video analysis model) associated with the video analysis from a database of a vendor or manufacture that provides and/or updates the model. In some embodiments, the network 120 may be any type of wired or wireless network, or any combination thereof.

The acquisition device 130 may be configured to capture video data. For example, the acquisition device 130 may continuously capture video data to obtain a video stream. In some embodiments, the acquisition device 130 may include a camera 130-1, a video recorder 130-2, an image sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The image sensor 130-3 may include a Charge Coupled Device (CCD) image sensor, a Complementary Metal Oxide Semiconductor (CMOS) image sensor, or the like, or any combination thereof. In some embodiments, the acquisition device 130 may include a plurality of components each of which can capture video data. For example, the acquisition device 130 may include a plurality of sub-cameras that can capture video data simultaneously. In some embodiments, the acquisition device 130 may transmit the captured video data to one or more components (e.g., the server 110, the storage device 140) of the video analysis system 100 via the network 120.

The storage device 140 may be configured to store data and/or instructions. The data and/or instructions may be obtained from, for example, the server 110, the acquisition device 130, and/or any other component of the video analysis system 100. In some embodiments, the storage device 140 may store data and/or instructions that the server 110 may execute or use to perform exemplary methods described in the present disclosure. In some embodiments, the storage device 140 may include a mass storage, a removable storage, a volatile read-and-write memory, a read-only memory (ROM), or the like, or any combination thereof.

In some embodiments, the storage device 140 may be connected to the network 120 to communicate with one or more components (e.g., the server 110, the acquisition device 130) of the video analysis system 100. One or more components of the video analysis system 100 may access the data or instructions stored in the storage device 140 via the network 120. In some embodiments, the storage device 140 may be directly connected to or communicate with one or more components (e.g., the server 110, the acquisition device 130) of the video analysis system 100. In some embodiments, the storage device 140 may be part of other components of the video analysis system 100, such as the server 110, or the acquisition device 130.

In some embodiments, the video analysis system 100 may further include a user device (not shown) configured to receive information and/or data from the server 110, the acquisition device 130, and/or the storage device 140, via the network 120. For example, the user device may receive the video stream from the acquisition device 130 and/or the one or more target frames from the server 110. In some embodiments, the user device may provide a user interface via which a user may view information and/or input data and/or instructions to the video analysis system 100. For example, the user may view the video stream and/or the one or more target frames via the user interface. As another example, the user may input an instruction associated with the video analysis via the user interface. In some embodiments, the user device may include a mobile phone, a computer, a wearable device, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
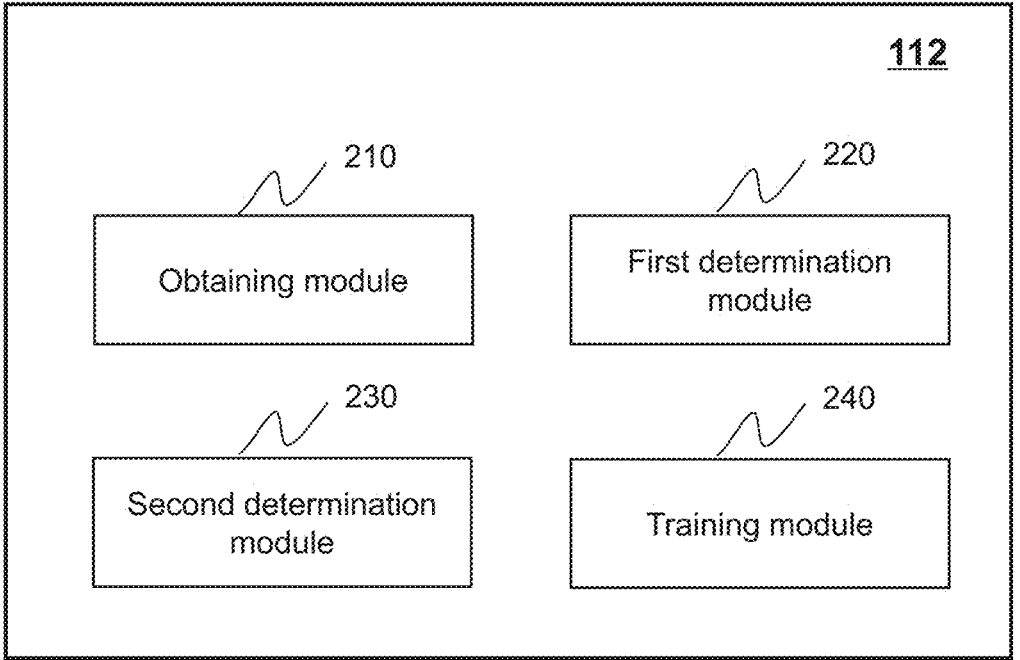
FIG. 2 is a block diagram illustrating an exemplary processing device according to some embodiments of the present disclosure.

FIG. 2 is a block diagram illustrating an exemplary processing device according to some embodiments of the present disclosure. The processing device (e.g., the processing device 112) may include an obtaining module 210, a first determination module 220, a second determination module 230, and a training module 240.

The obtaining module 210 may be configured to obtain a video stream. More descriptions regarding the obtaining of the video stream may be found elsewhere in the present disclosure, for example, operation 310 in FIG. 3 and relevant descriptions thereof.

The first determination module 220 may be configured to determine a reference score corresponding to the frame based on a spatiotemporal feature of the frame. In some embodiments, the first determination module 220 may determine, using a video analysis model, the reference score corresponding to the frame based on spatiotemporal feature of the frame. In some embodiments, the first determination module 220 may determine an analysis region in the video stream. By determining the analysis region in the video stream, the first determination module 220 may only process (e.g., analyze) a portion, in the analysis region, of each frame in the video stream. Specifically, for each of the plurality of frames in the video stream, the first determination module 220 may determine the reference score corresponding to the frame based on a spatiotemporal feature of the portion, in the analysis region, of the frame. More descriptions regarding the determining of the reference score may be found elsewhere in the present disclosure, for example, operation 320 in FIG. 3 and relevant descriptions thereof.

The second determination module 230 may be configured to determine, from the plurality of frames in the video stream, one or more target frames based on reference scores corresponding to the plurality of frames. In some embodiments, in order to determine the one or more target frames, the second determination module 230 may filter the plurality of frames in the video stream based on the reference scores corresponding to the plurality of frames by setting preset conditions. In some embodiments, after the one or more target frames are determined, the second determination module 230 may determine an analysis result of the video stream based on the one or more target frames. More descriptions regarding the determining of the one or more target frames may be found elsewhere in the present disclosure, for example, operation 330 in FIG. 3 and relevant descriptions thereof.

The training module 240 may be configured to determine a video analysis network. For example, the training module 240 may obtain a plurality of sample video streams. For each of the plurality of sample video streams, the training module 240 may label a plurality of sample frames in the sample video stream. Further, the training module 240 may determine the video analysis network by training a preliminary video analysis network based on the plurality of labeled sample video streams. More descriptions regarding the determining of the video analysis network may be found elsewhere in the present disclosure, for example, FIG. 9 and relevant descriptions thereof.

The modules in the processing device may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units. For example, the first determination module 220 and the second determination module 230 may be combined as a single module which may both determine the reference scores corresponding to the plurality of frames in the video stream and the one or more target frames. In some embodiments, the processing device may include one or more additional modules. For example, the processing device may also include a transmission module (not shown) configured to transmit signals (e.g., electrical signals, electromagnetic signals) to one or more components (e.g., the acquisition device 130) of the video analysis system 100. As another example, the processing device may include a storage module (not shown) used to store information and/or data (e.g., the video stream, the reference scores corresponding to the plurality of frames in the video stream, the one or more target frames) associated with the video analysis. In some embodiments, the training module 240 may be implemented on a separate device (e.g., a processing device independent from the server 110). In some embodiments, the training module 240 may be unnecessary and the video analysis network may be obtained from a storage device (e.g., the storage device 140) disclosed elsewhere in the present disclosure, an external storage device.

Figure 3:
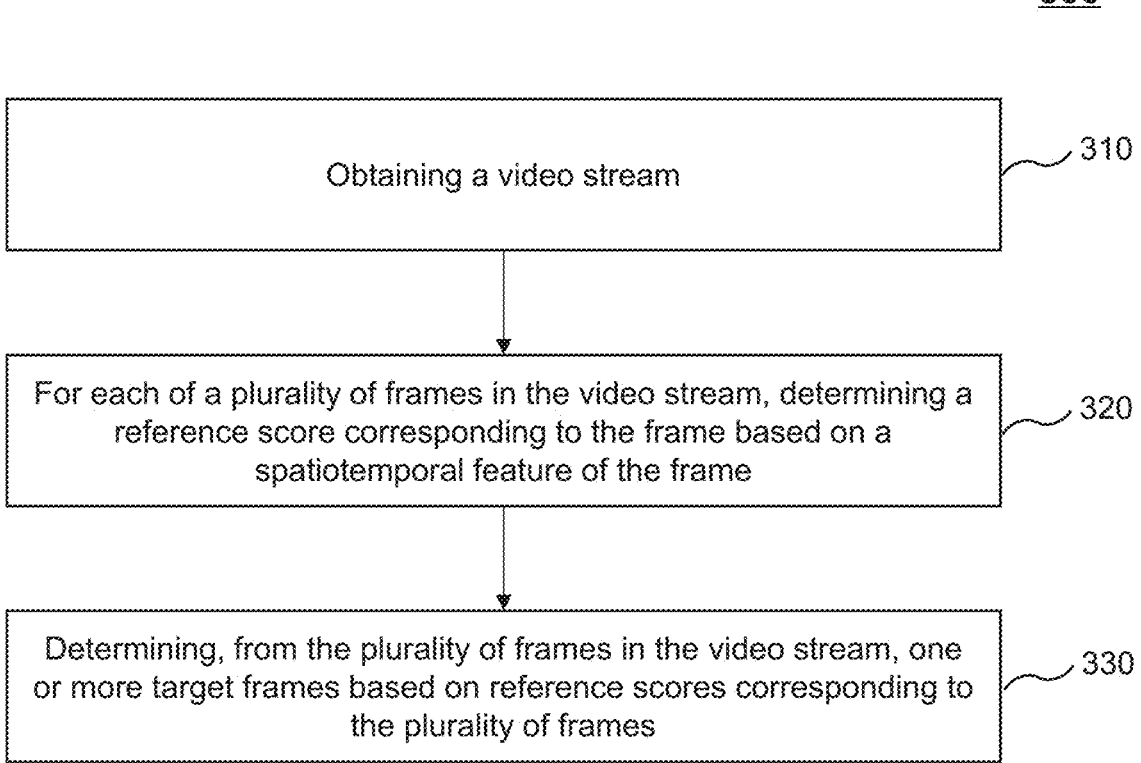
FIG. 3 is a flowchart illustrating an exemplary process for video analysis according to some embodiments of the present disclosure.

FIG. 3 is a flowchart illustrating an exemplary process for video analysis according to some embodiments of the present disclosure. In some embodiments, process 300 may be executed by the video analysis system 100 (e.g., the processing device 112) (e.g., the one or more modules illustrated in FIG. 2). In some embodiments, the process 300 may be accomplished with one or more additional operations not described and/or without one or more of the operations discussed. Additionally, the order of the operations of process 300 illustrated in FIG. 3 and described below is not intended to be limiting.

In 310, the processing device (e.g., the processing device 112 illustrated in FIG. 1) (e.g., the obtaining module 210 illustrated in FIG. 2) may obtain a video stream. As used herein, the video stream may refer to a continuous video. For example, the video stream may be a video captured by a video recorder (e.g., the video recorder 130-2).

In some embodiments, the processing device may obtain the video stream in multiple manners. For example, the processing device may obtain the video stream from an acquisition device (e.g., the acquisition device 130) (the video recorder 130-2). Merely by way of example, the processing device may direct a video recorder 130-2 installed beside a traffic road to continuously capture a video of the traffic road and obtain a video stream of the traffic road accordingly. As another example, the video data stream may be previously acquired by the acquisition device and stored in a storage device (e.g., the storage device 140). The processing device may obtain the video data stream from the storage device via a network (e.g., the network 120).

In 320, for each of a plurality of frames in the video stream, the processing device (e.g., the processing device 112 illustrated in FIG. 1) (e.g., the first determination module 220 illustrated in FIG. 2) may determine a reference score corresponding to the frame based on a spatiotemporal feature of the frame.

As used herein, the reference score corresponding to a frame may indicate a probability that the frame involves an event (e.g., a traffic abnormal event). The spatiotemporal feature of the frame may refer to a feature that associates a feature of the frame with a feature of at least one adjacent frame of the frame. A feature of a frame may include a color feature, a texture feature, a shape feature, an edge feature, or the like, or any combination thereof.

In some embodiments, the processing device may determine, using a video analysis model, the reference score corresponding to the frame based on spatiotemporal feature of the frame. Specifically, the processing device may determine, using a video analysis model, the reference score corresponding to the frame based on the feature of the frame and the feature of the at least one adjacent frame of the frame. For example, the processing device may input features of the plurality of frames in the video stream into the video analysis model and determine reference scores corresponding to the plurality of frames based on an output of the video analysis model.

In some embodiments, the video analysis model may include a video analysis network. The video analysis network may be a machine learning model. For example, the video analysis network may be a convolutional neural network (CNN). In some embodiments, the video analysis network may include a feature extraction layer, a feature association layer, and a prediction layer. The feature extraction layer may be configured to extract the features of the plurality of frames in the video stream. Merely by way of example, the feature extraction layer may be 2D-CNNs (e.g., a resnet-101). The feature association layer may be configured to determine the spatiotemporal feature of the frame by associating the feature of the frame with the feature of the at least one adjacent frame of the frame. Merely by way of example, the feature association layer may be a long short-term memory (LSTM) (e.g., a bi-directional long short-term memory) network or a recurrent neural network (RNN). The prediction layer may be configured to determine the reference score corresponding to the frame based on the spatiotemporal feature of the frame. Merely by way of example, the preliminary prediction layer may be a feedforward neural network or a multilayer perceptron (MLP). More descriptions regarding the video analysis network may be found elsewhere in the present disclosure (e.g., FIG. 8 and the description thereof).

According to some embodiments in the present disclosure, reference scores corresponding to each frame in the video stream are determined based on a spatiotemporal feature of the frame, which involves the change and correlation between the current frame and the adjacent frame of the current frame, thereby improving the accuracy of the analysis of the video stream.

In some embodiments, the video analysis model may be obtained by a processing device that is same as or different from the processing device for performing process 300. In some embodiments, the processing device may obtain a plurality of sample video streams. For each of the plurality of sample video streams, the processing device may label a plurality of sample frames in the sample video stream. Further, the processing device may determine the video analysis network by training a preliminary video analysis network based on the plurality of labeled sample video streams. More descriptions regarding the training of the video analysis network may be found elsewhere in the present disclosure (e.g., FIG. 9 and the description thereof).

In some embodiments, the video analysis model may include a plurality of cache units. Each of the plurality of cache units may be connected to the video analysis network and configured to cache a same number of frames as a number of frames that are inputted into the video analysis network in a single processing of the video analysis network. More descriptions regarding the plurality of cache units may be found elsewhere in the present disclosure (e.g., FIG. 7 and the description thereof). More descriptions regarding the video analysis model may be found elsewhere in the present disclosure (e.g., FIG. 6 and the description thereof).

Figure 4:
FIG. 4 is a schematic diagram illustrating an exemplary an analysis region according to some embodiments of the present disclosure.

In some embodiments, the processing device may determine an analysis region in the video stream. The processing device may extract a frame from a video stream and determine a region in the frame as the analysis region in the video stream. It should be noted that a position of the analysis region in each frame in the video stream is the same. The analysis region may have any shape, for example, a polygon shape, a circle shape, an irregular shape, etc. FIG. 4 is a schematic diagram illustrating an exemplary an analysis region according to some embodiments of the present disclosure. As illustrated in FIG. 4, a region (i.e., a road region) in a white irregular shape may be an analysis region in a video stream that includes a frame 410. By determining the analysis region in the video stream, the processing device may only process (e.g., analyze) a portion, in the analysis region, of each frame in the video stream. Specifically, for each of the plurality of frames in the video stream, the processing device may determine the reference score corresponding to the frame based on a spatiotemporal feature of the portion, in the analysis region, of the frame. In such case, the portion, outside the analysis region, of each frame in the video stream can be left unprocessed, which eliminates the interference of information of the portion outside the analysis region on the subsequently determined analysis result, thereby improving the accuracy of the analysis of the video stream.

In 330, the processing device (e.g., the processing device 112 illustrated in FIG. 1) (e.g., the second determination module 230 illustrated in FIG. 2) may determine, from the plurality of frames in the video stream, one or more target frames based on reference scores corresponding to the plurality of frames.

Figure 5:
FIG. 5 is a schematic diagram illustrating exemplary events according to some embodiments of the present disclosure.
Figure 5:
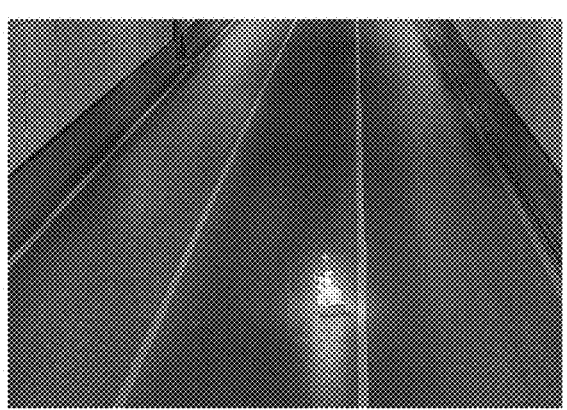
Figure 5:

In some embodiments, the one or more target frames may involve a scene of a traffic road in where the transportation is affected by an event, a phenomenon, etc., appearing or occurring on the traffic road. Merely by way of example, the event may include cargo throwing, traffic accidents, smoke, fire, road construction, or the like, or any combination thereof. Merely by way of example, the phenomenon may include agglomerate fog. FIG. 5 is a schematic diagram illustrating exemplary events according to some embodiments of the present disclosure. As illustrated in FIG. 5, frame A is a target frame involving the cargo throwing; frame B is a target frame involving the traffic accidents; frame C is a target frame involving the fire; frame D is a target frame involving the road construction.

In some embodiments, in order to determine the one or more target frames, the processing device may filter the plurality of frames in the video stream based on the reference scores corresponding to the plurality of frames by setting preset conditions. For example, for each of the plurality of frames in the video stream, the processing device may determine whether the reference score corresponding to the frame is larger than a first threshold. In response to determining that the reference score corresponding to the frame is larger than the first threshold, the processing device may determine whether a similarity degree between the frame and a previous frame of the frame is less than a second threshold. In response to determining that the similarity degree is less than the second threshold, the processing device may designate the frame as a target frame. More descriptions regarding the video analysis model may be found elsewhere in the present disclosure (e.g., FIG. 10 and the description thereof).

In some embodiments, after the one or more target frames are determined, the processing device may determine an analysis result of the video stream based on the one or more target frames. For example, for each of the one or more target frames, the processing device may determine, using a detection model, a detection result based on the target frame. Further, the processing device may determine an analysis result of the video stream based on detection results corresponding to the one or more target frames. Merely by way of example, the analysis result of the video stream may include at least one target frame, an occurrence region of an event involved in the at least one target frame, a type of the event, and/or a target probability that the type of the event is the same as a type of an abnormal event (e.g., cargo throwing, traffic accidents, smoke, fire, and agglomerate fog, road construction). More descriptions regarding the determining of the analysis result may be found elsewhere in the present disclosure (e.g., FIGS. 11-12 and the description thereof).

According to some embodiments in the present disclosure, the one or more target frames involving the event may be determined from the plurality of frames in the video stream, which may reduce or avoid the impact of other frames in the video stream that do not involve the event on the analysis of the video stream, thereby improving the efficiency and/or accuracy of the analysis of the video stream.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation, a transmitting operation) may be added elsewhere in the process 300. In the storing operation, the processing device may store information and/or data (e.g., the video stream, the reference scores corresponding to the plurality of frames in the video stream, the one or more target frames) associated with the video analysis in a storage device (e.g., the storage device 140) disclosed elsewhere in the present disclosure. In the transmitting operation, the processing device may transmit the video stream, the one or more target frames, and/or the analysis result of the video stream to a user device for display. As another example, operation 320 and operation 330 may be combined into a single operation in which the processing device may both determine the reference scores corresponding to the plurality of frames and the one or more target frames.

Figure 6:
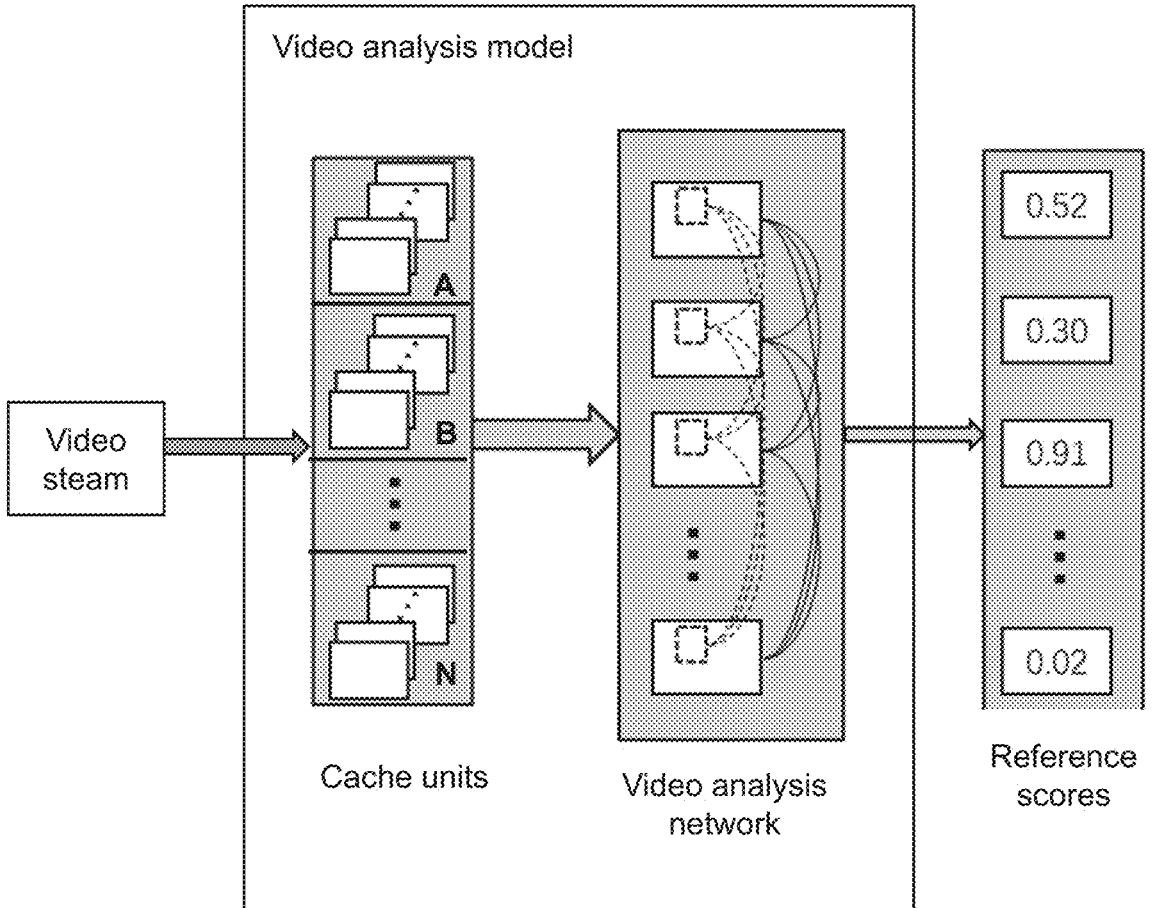
FIG. 6 is a schematic diagram illustrating an exemplary video analysis model according to some embodiments of the present disclosure.

FIG. 6 is a schematic diagram illustrating an exemplary video analysis model according to some embodiments of the present disclosure. As illustrated in FIG. 6, a video analysis model may include a plurality of cache units (e.g., A, B, N) and a video analysis network. Each of the plurality of cache units may be connected to the video analysis network. The processing device may input a video stream into the plurality of cache units. Each of the plurality of cache units may store a certain number of frames in the video stream and input the frames into the video analysis network. More descriptions regarding the plurality of cache units may be found elsewhere in the present disclosure (e.g., FIG. 7 and the description thereof). The video analysis network may process the frames and output reference scores (e.g., 0.52, 0.30, 0.91, . . . , 0.02) corresponding to the frames respectively. More descriptions regarding the video analysis network may be found elsewhere in the present disclosure (e.g., FIG. 8 and the description thereof).

Figure 7:
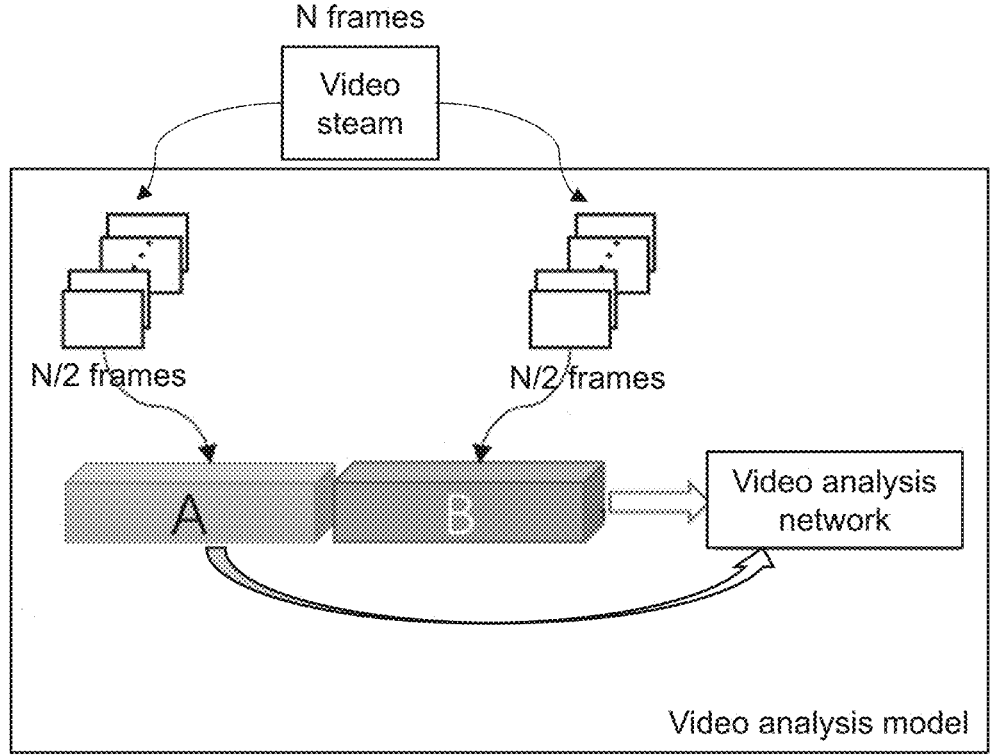
FIG. 7 is a schematic diagram illustrating an exemplary video analysis model according to some embodiments of the present disclosure.

FIG. 7 is a schematic diagram illustrating an exemplary video analysis model according to some embodiments of the present disclosure. As illustrated in FIG. 7, a video analysis model may include a cache unit A, a cache unit B, and a video analysis network. The cache unit A and the cache unit B may be connected with the video analysis network. The cache unit A and the cache unit B may cache the same number of frames. The video analysis network may process the frames stored in the cache unit A and the cache unit B alternately. For example, as illustrated in FIG. 7, a video stream including N frames may be input into the video analysis model. N frames may be equally divided into two parts each of which includes N/2 frames. The two parts may be stored in the cache unit A and the cache unit B, respectively. In some embodiments, the N/2 frames stored in the cache unit A may first be transmitted to the video analysis network for processing. After the N/2 frames transmitted from the cache unit A is processed, the video analysis network may receive the N/2 frames stored in the cache unit B for processing. In the above process, the cache unit A may store a next N/2 frames of a next video stream. Alternate storage and transmission of the cache unit A and the cache unit B may reduce the waste of storage space while improving the real-time performance of the video analysis of the video analysis model.

Figure 8:
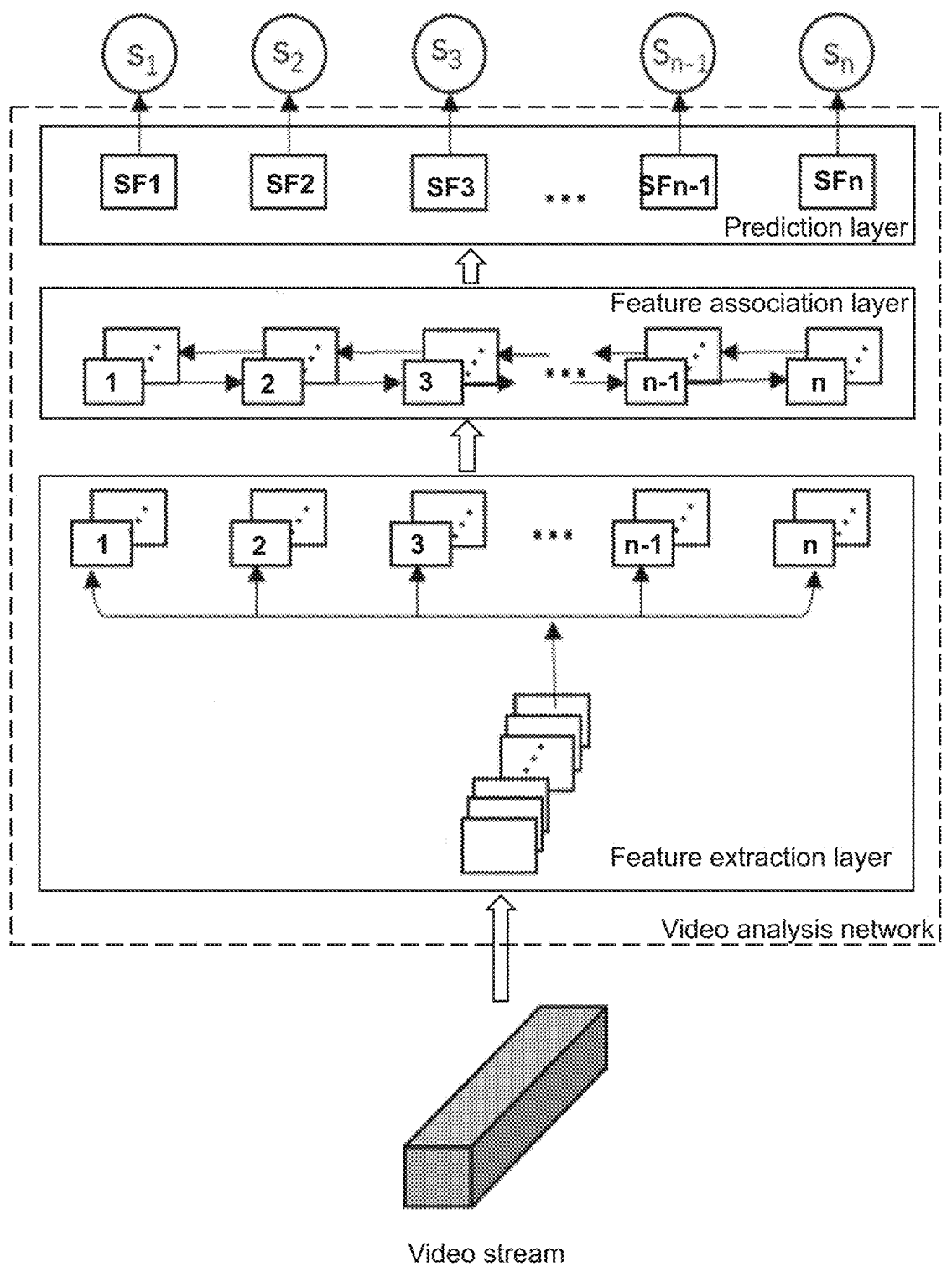
FIG. 8 is a schematic diagram illustrating an exemplary video analysis network according to some embodiments of the present disclosure.

FIG. 8 is a schematic diagram illustrating an exemplary video analysis network according to some embodiments of the present disclosure. As illustrated in FIG. 8, a video analysis network may include a feature extraction layer, a feature association layer, and a prediction layer. A video stream may be input into the feature extraction layer. The feature extraction layer may extract features of a plurality of frames (e.g., 1, 2, 3, . . . , n−1, n) in the video stream and transmit the extract features to the feature association layer. The feature association layer may associate a feature of each frame in the video stream with a feature of one or two adjacent frames of the frame to determine a spatiotemporal feature of the frame. For example, for the frame 1, the feature association layer may associate the feature of the frame 1 and the feature of the frame 2; for the frame 2, the feature association layer may associate the feature of the frame 2 and features of the frames 1 and 3. Further, the feature association layer may transmit spatiotemporal features (e.g., SF1, SF2, SF3, . . . , SFn−1, SFn) of the plurality of frames (e.g., 1, 2, 3, . . . , n−1, n) to the prediction layer. For each of the plurality of frames (e.g., 1, 2, 3, . . . , n−1, n), the prediction layer may determine a reference score (e.g., $S_1$, $S_2$, $S_3$, . . . , $S_{n-1}$, $S_n$) corresponding to the frame based on a spatiotemporal feature of the frame.

Figure 9:
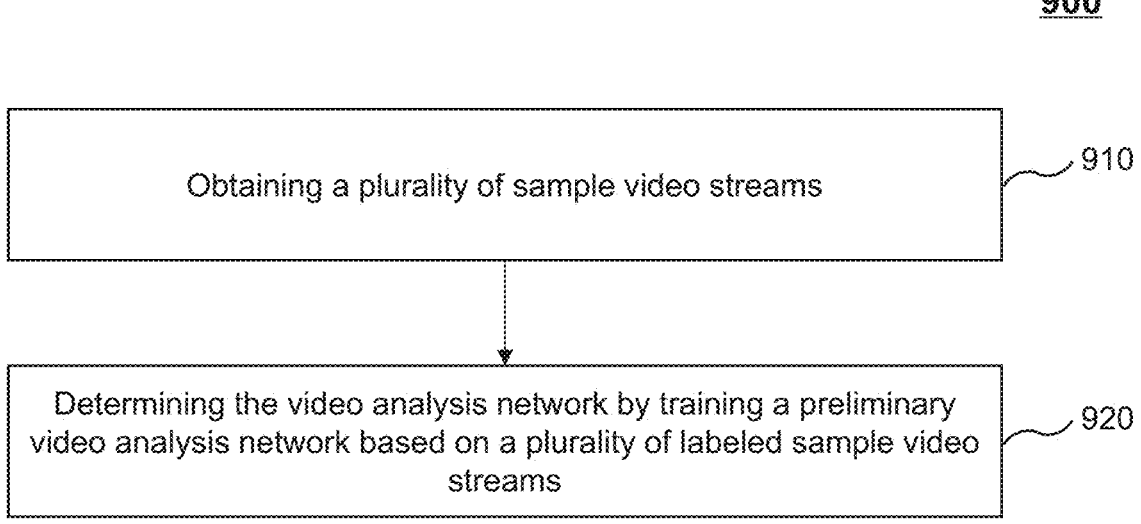
FIG. 9 is a flowchart illustrating an exemplary process for determining a video analysis network according to some embodiments of the present disclosure.

FIG. 9 is a flowchart illustrating an exemplary process for determining a video analysis network according to some embodiments of the present disclosure. In some embodiments, process 900 may be executed by the video analysis system 100 (e.g., the processing device 112) (e.g., the one or more modules illustrated in FIG. 2) or a system (e.g., a system of a vendor who provides and/or maintains such a video analysis network) independent from the video analysis system 100.

In 910, the processing device (e.g., the processing device 112 illustrated in FIG. 1) (e.g., the training module 240 illustrated in FIG. 2) may obtain a plurality of sample video streams.

In some embodiments, each of the plurality of sample video streams may involve a scene of a traffic road in where the transportation is affected by an event (e.g., cargo throwing, traffic accidents, smoke, fire, and agglomerate fog, road construction), a phenomenon (e.g., agglomerate fog), etc., appearing or occurring on the traffic road. In some embodiments, each of the plurality of sample video streams may include at least one first frame corresponding to a moment of the abnormal event and a plurality of second frames corresponding to other moments. For example, in a specific sample video stream, a frame in the sample video stream that is captured at a moment of a traffic accident) may be the first frame; other frames in the sample video stream may be the second frame.

In some embodiments, at least a portion of the plurality of sample video streams may be selected manually by a user or determined automatically by using any feasible algorithm.

In some embodiments, for each of the plurality of sample video streams, the processing device may label a plurality of sample frames in the sample video stream. In some embodiments, the processing device may label the at least one first frame in the sample video stream with a first score. The first score may be a default setting (e.g., 1) of the video analysis system 100 or may be adjustable under different situations.

In some embodiments, the processing device may label each of the plurality of second frames in the sample video stream with a second score. The processing device may determine the second score based on a similarity between the at least one first frame and the second frame. Specifically, the processing device may extract, using a feature extraction model, features of the at least one first frame and the second frame, respectively. Merely by way of example, the feature extraction model may be two-dimensional convolutional neural networks (2D-CNNs) (e.g., a resnet-101). Further, the processing device may determine, based on a similarity algorithm, the similarity between the features of the at least one first frame and the second frame as the second score. Merely by way of example, the similarity algorithm may include a cosine similarity, a Pearson correlation coefficient, a deep learning model, or the like, or any combination thereof. For example, the processing device may determine the cosine similarity between the features of the at least one first frame and the second frame as the second score.

In 920, the processing device (e.g., the processing device 112 illustrated in FIG. 1) (e.g., the training module 240 illustrated in FIG. 2) may determine the video analysis network by training a preliminary video analysis network based on the plurality of labeled sample video streams.

In some embodiments, the preliminary video analysis network may include a preliminary feature extraction layer, a preliminary feature association layer, and a preliminary prediction layer. Merely by way of example, the preliminary feature extraction layer may be 2D-CNNs (e.g., a resnet-101); the preliminary feature association layer may be a long short-term memory (LSTM) (e.g., a bi-directional long short-term memory) network or a recurrent neural network (RNN); the preliminary prediction layer may be a feedforward neural network or a multilayer perceptron (MLP).

In some embodiments, for each of the plurality of labeled sample video streams, the processing device may determine a loss function based on prediction scores and labeled scores (e.g., the first score, the second score) corresponding to a plurality of sample frames in the labeled sample video stream respectively. The processing device may determine a prediction score corresponding to each sample frame in the labeled sample video stream using the preliminary video analysis network. For example, the processing device may input the labeled sample video stream into the preliminary video analysis network and determine prediction scores corresponding to the plurality of sample frames in the labeled sample video stream based on an output of the preliminary video analysis network.

The loss function may include a loss term and a deviation term. The loss term may indicate a relationship between a label score and a prediction score corresponding to each sample frame in the labeled sample video stream. The loss term may indicate the accuracy of the score predictions determined based on the preliminary video analysis network. The processing device may determine the loss term in various ways. For example, the processing device may determine a mean square error or an average value of differences each of which is between a prediction score and a labeled score corresponding to each sample frame in the labeled sample video stream.

The deviation term may indicate a relationship between a label score and a prediction score respectively corresponding to different sample frames in the sample video stream. The deviation term may indicate the accuracy with which the preliminary video analysis network recognizes the difference between different frames. The processing device may determine the deviation term in various ways. For example, for each pair of adjacent sample frames in the plurality of sample frames, the processing device may determine a difference between differences each of which is between a prediction score and a labeled score corresponding to one of the pair of adjacent sample frames. Further, the processing device may determine the deviation term based on differences each of which corresponds to one of multiple pairs of adjacent sample frames in the plurality of sample frames.

As another example, for each pair of adjacent sample frames in the plurality of sample frames, the processing device may determine a first difference of prediction scores corresponding to the pair of adjacent sample frames and a second difference of labeled scores corresponding to the pair of adjacent sample frames. Further, the processing device may determine the deviation term based on first differences and second differences corresponding to multiple pairs of adjacent sample frames in the plurality of sample frames. Merely by way of example, the processing device may determine the deviation term according to formula (1) below:

$$DT = \frac{1}{n-1} \sum\nolimits_{i=1}^{n-1} [(s_{i+1} - s_i) - (t_{i+1} - t_i)]^2, \tag{1}$$

where DT refers to the second mean square error, n refers to a count of the first differences corresponding to the plurality of sample frames in the labeled sample video stream, $s_i$ refers to a prediction score corresponding to a i-th frame in the plurality of sample frames, $s_i+1$ refers to a prediction score corresponding to a (i+1)-th frame in the plurality of sample frames, $t_i$ refers to a labeled score corresponding to the i-th frame in the plurality of sample frames, and $t_{i+1}$ refers to a labeled score corresponding to the (i+1)-th frame in the plurality of sample frames. The i-th frame and the (i+1)-th frame may be a pair of adjacent sample frames in the plurality of sample frames.

The processing device may determine the loss function by combining the loss term and the deviation term in various ways. For example, the processing device may determine a sum or a weighted sum of the loss term and the deviation term as the loss function. Merely by way of example, the processing device may determine the loss function according to formula (2) below:

$$SobLoss(s, t) = \frac{1}{n}\sum_{i=1}^{n}(s_i - t_i)^2 + DT = \qquad (2)$$

$$\frac{1}{n}\sum_{i=1}^{n}(s_i - t_i)^2 + \frac{1}{n-1}\sum_{i=1}^{n-1}[(s_{i+1} - s_i) - (t_{i+1} - t_i)]^2,$$

where SobLoss(s,t) refers to the loss function, and $$\frac{1}{n}\sum_{i=1}^{n}(s_i - t_i)^2$$

refers to the loss term.

Further, the processing device may determine the video analysis network by training the preliminary video analysis network based on the plurality of labeled sample video streams and corresponding values of the loss function. For example, the processing device may train the preliminary video analysis network iteratively based on the plurality of labeled sample video streams until a value of a loss function in a current iteration converges or is minimal or smaller than a predetermined threshold. As used herein, "convergence" may refer to that a variation of the values of the loss function in two or more consecutive iterations or a difference between the value of the loss function in the current iteration and a target value is equal to or smaller than a predetermined threshold.

According to some embodiments in the present disclosure, the deviation term is used to determine the loss function, which involves a time relationship between each pair of adjacent sample frames in the plurality of sample frames and a sequence property of the labeled sample video stream, thereby improving the accuracy of the video analysis network obtained based on the loss function.

In some embodiments, the processing device may construct the feature extraction layer in the video analysis network by a transfer learning. As used herein, the transfer learning may refer to directly using a feature extraction layer of other trained models as the feature extraction layer in the video analysis network. Further, the processing device may determine the feature association layer and the prediction layer by training a preliminary feature association layer and a preliminary prediction layer based on the plurality of labeled sample video streams according to a similar manner as the training of the preliminary video analysis network.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 10:
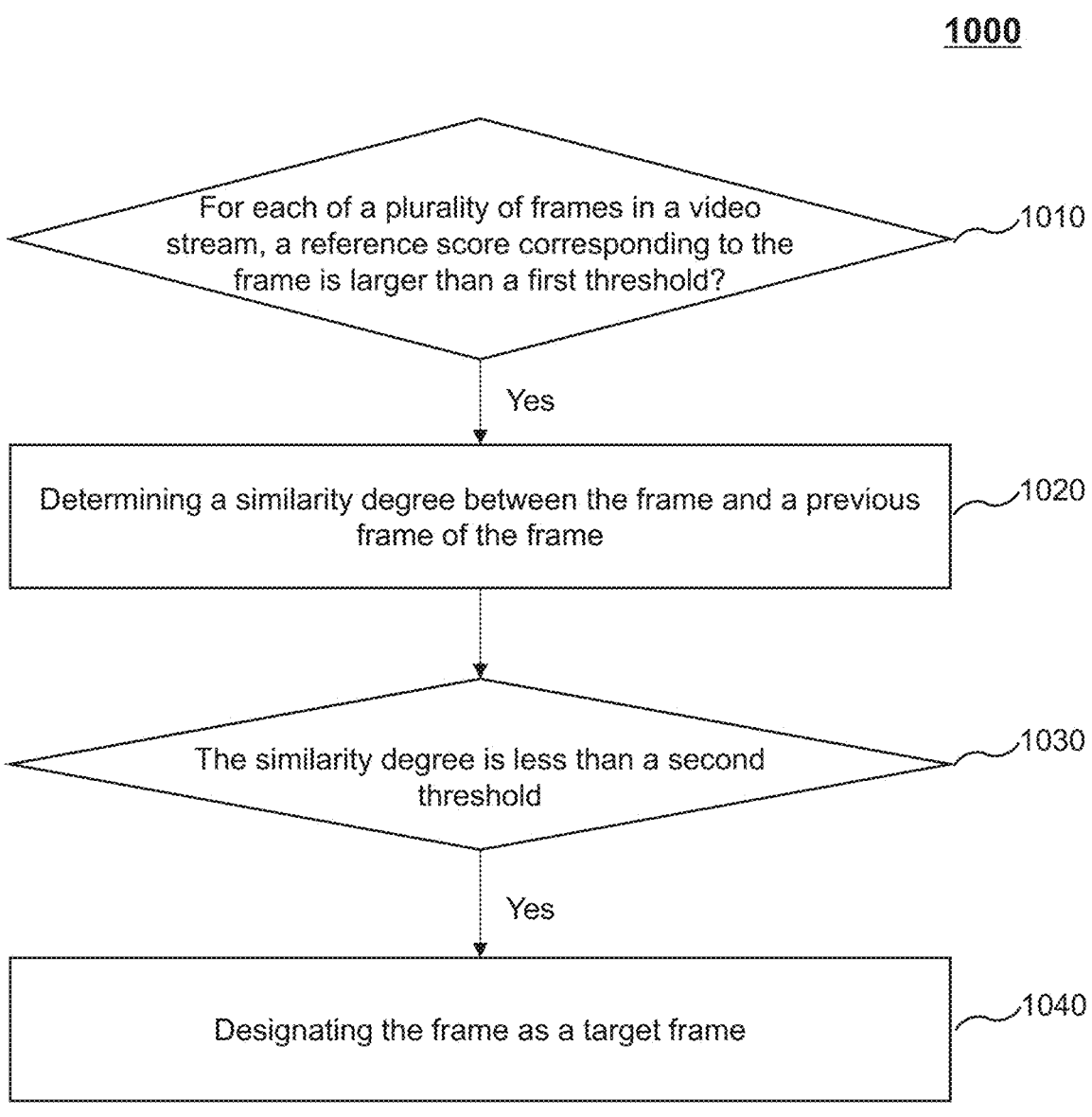
FIG. 10 is a flowchart illustrating an exemplary process for determining one or more target frames according to some embodiments of the present disclosure.

FIG. 10 is a flowchart illustrating an exemplary process for determining one or more target frames according to some embodiments of the present disclosure. In some embodiments, process 1000 may be executed by the video analysis system 100 (e.g., the processing device 112) (e.g., the one or more modules illustrated in FIG. 2). In some embodiments, one or more operations of the process 1000 may be performed to achieve at least part of operation 330 as described in connection with FIG. 3.

In 1010, for each of a plurality of frames in a video stream, the processing device (e.g., the processing device 112 illustrated in FIG. 1) (e.g., the second determination module 230 illustrated in FIG. 2) may determine whether a reference score corresponding to the frame is larger than a first threshold. The first threshold may be a default setting of the video analysis system 100, or may be adjustable under different situations, or may be determined by other manners (e.g., determined based on user experience). If the reference score corresponding to the frame is larger than the first threshold (which indicates that a probability that the frame involves an abnormal event is relatively larger), the processing device may perform operations 1020 and 1030. If the reference score corresponding to the frame is less than or equal to the first threshold (which indicates that the probability that the frame involves an abnormal event is relatively less), the processing device may discard (or delete) the frame and further perform operation 1010 to process a next frame in the plurality of frames in the video stream.

In 1020, the processing device (e.g., the processing device 112 illustrated in FIG. 1) (e.g., the second determination module 230 illustrated in FIG. 2) may determine a similarity degree between the frame and a previous frame of the frame. For example, when the frame is i-th frame in the plurality of frames in the video stream, the previous frame of the frame may be (i−1)-th frame in the plurality of frames in the video stream. The similarity degree between the frame and the previous frame of the frame may be determined according to a similar manner as the similarity between the at least one first frame and the second frame disclosed elsewhere in the present disclosure (e.g., FIG. 9 and the description thereof).

In 1030, the processing device (e.g., the processing device 112 illustrated in FIG. 1) (e.g., the second determination module 230 illustrated in FIG. 2) may determine whether the similarity degree is less than a second threshold. The second threshold may be a default setting of the video analysis system 100 or may be adjustable under different situations. If the similarity degree is less than the second threshold, the processing device may perform operation 1040. If the similarity degree is larger than or equal to the second threshold, the processing device may discard (or delete) the frame and further perform operation 1010 to process a next frame in the plurality of frames in the video stream.

In 1040, the processing device (e.g., the processing device 112 illustrated in FIG. 1) (e.g., the second determination module 230 illustrated in FIG. 2) may designate the frame as a target frame. Further, the processing device may output the target frame and/or store the target frame in a storage device (e.g., the storage device 140) disclosed elsewhere in the present disclosure.

According to some embodiments in the present disclosure, a frame with the probability that the frame involves an abnormal event is relatively less or a probability that the frame and the previous frame of the frame are the same is relatively larger is discarded (or deleted), which reduces the number of target frames and increases the speed of the video analysis and the accuracy of the video analysis.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 11 is a flowchart illustrating an exemplary process for determining an analysis result of a video stream according to some embodiments of the present disclosure. In some embodiments, process 1100 may be executed by the video analysis system 100 (e.g., the processing device 112) (e.g., the one or more modules illustrated in FIG. 2).

In 1110, for each of the one or more target frames, the processing device (e.g., the processing device 112 illustrated in FIG. 1) (e.g., the second determination module 230 illustrated in FIG. 2) may determine a detection result based on the target frame using a detection model.

In some embodiments, the detection model may be a machine learning model. For example, the detection model may include You Only Look Once (YOLO), Single Shot MultiBox Detector (SSD), Faster-Region-CNN, CenterNet, or the like, or any combination thereof. In some embodiments, the processing device may input the target frame into the detection model and determine the detection result based on an output of the detection model.

In some embodiments, the detection result may include at least one of an occurrence region, in the target frame, of an event involved in the target frame or a probability that a type of the event is the same as a type of at least one abnormal event (e.g., cargo throwing, traffic accidents, smoke, fire, and agglomerate fog, road construction). The occurrence region of the event may be a location or a location region that the event occurs. Merely by way of example, the probability may include a first probability corresponding to cargo throwing, a second probability corresponding to a traffic accident, a third probability corresponding to smoke, fire, and agglomerate fog, and a fourth probability corresponding to road construction. In some embodiments, the probability may be expressed as a decimal or a percentage. For example, the probability may be expressed as a decimal between 0-1.

In 1120, the processing device (e.g., the processing device 112 illustrated in FIG. 1) (e.g., the second determination module 230 illustrated in FIG. 2) may determine an analysis result of the video stream based on detection results corresponding to the one or more target frames.

In some embodiments, the processing device may determine the analysis result of the video stream by processing the detection results corresponding to the one or more target frames based on preset rules. For example, for each of the one or more target frames, the processing device may determine whether a center of the occurrence region of the event associated with the target frame is located in an analysis region in the video stream. In response to determining that the center of the occurrence region of the event associated with the target frame is located in the analysis region in the video stream, the processing device may determine whether the probability that the type of the event is the same as a type of at least one abnormal event is larger than a probability threshold associated with the at least one abnormal event. In response to determining that the probability that the type of the event is the same as a type of at least one abnormal event is larger than the probability threshold associated with the at least one abnormal event, the processing device may determine whether the occurrence region of the event associated with the target frame satisfies a condition. In response to determining that the detection result corresponding to the target frame satisfies the condition, the processing device may determine the analysis result of the video stream based on the detection result corresponding to the target frame. More descriptions regarding the determining of the analysis result may be found elsewhere in the present disclosure (e.g., FIG. 12 and the description thereof).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 12 is a flowchart illustrating an exemplary process for determining an analysis result of a video stream according to some embodiments of the present disclosure. In some embodiments, process 1200 may be executed by the video analysis system 100 (e.g., the processing device 112) (e.g., the one or more modules illustrated in FIG. 2). In some embodiments, one or more operations of the process 1200 may be performed to achieve at least part of operation 1120 as described in connection with FIG. 11.

In 1210, for each of one or more target frames in a video stream, the processing device (e.g., the processing device 112 illustrated in FIG. 1) (e.g., the second determination module 230 illustrated in FIG. 2) may determine whether a center of an occurrence region of an event associated with the target frame is located in an analysis region in the video stream. If the center of the occurrence region of the event associated with the target frame is located in the analysis region, the processing device may perform operation 1220; if the center of the occurrence region of the event associated with the target frame is not located in the analysis region, the processing device may discard (or delete) the target frame and further perform operation 1210 to process a next target frame in the one or more target frames in the video stream.

In 1220, the processing device (e.g., the processing device 112 illustrated in FIG. 1) (e.g., the second determination module 230 illustrated in FIG. 2) may determine whether a probability in a detection result corresponding to the target frame is larger than a probability threshold associated with the at least one abnormal event. The probability threshold may be a default setting (e.g., 0.5) of the video analysis system 100 or may be adjustable under different situations.

For example, when the detection result corresponding to the target frame includes a first probability corresponding to cargo throwing, a second probability corresponding to a traffic accident, a third probability corresponding to smoke, fire, and agglomerate fog, and a fourth probability corresponding to road construction, the processing device may determine whether the first probability, the second probability, the third probability, and the fourth probability are larger than the probability threshold. If at least one of the first probability, the second probability, the third probability, and the fourth probability is larger than the probability threshold, the processing device may perform operation 1230. Further, the processing device may designate the at least one probability larger than the probability threshold as a target probability. If each of the first probability, the second probability, the third probability, and the fourth probability is less than or equal to the probability threshold, the processing device may discard (or delete) the target frame and further perform operation 1210 to process a next target frame in the one or more target frames in the video stream.

In 1230, the processing device (e.g., the processing device 112 illustrated in FIG. 1) (e.g., the second determination module 230 illustrated in FIG. 2) may determine whether the detection result corresponding to the target frame satisfies a condition.

In some embodiments, the condition may include an intersection-over-union (IOU) of the occurrence region of the event in the detection result corresponding to the target frame and an occurrence region of the event in a candidate detection result in the detection results corresponding to the one or more target frames is less than a third threshold. As used herein, the IOU may refer to an overlap rate of two occurrence regions. The third threshold may be a default setting (e.g., 0.3) of the video analysis system 100 or may be adjustable under different situations.

The candidate detection result may be determined before the detection result and a probability in the candidate detection result may be same as the probability in the detection result. For example, the one or more target frames include a target frame 1, a target frame 2, and a target frame 3. The detection result 1 corresponding to the target frame 1 includes probabilities 0.5, 0.4, 0.7, 0.2 corresponding to four abnormal events (e.g., cargo throwing, a traffic accident, smoke, fire, agglomerate fog, and road construction) respectively; the detection result 2 corresponding to the target frame 2 includes probabilities 0.3, 0.2, 0.5, 0.1 corresponding to four abnormal events respectively; the detection result 3 corresponding to the target frame 3 includes probabilities 0.5, 0.4, 0.7, 0.2 corresponding to four abnormal events. When the target frame 3 is processed, the detection result 1 may be the candidate detection result.

In some embodiments, the condition may include an interval between the target frame corresponding to the detection result and a target frame corresponding to a previous detection result of the detection result is larger than an interval threshold. The interval threshold may be a default setting (e.g., 5) of the video analysis system 100 or may be adjustable under different situations. Merely by way of example, the interval may be a time interval between the acquisition times of the target frame corresponding to the detection result and the target frame corresponding to a previous detection result of the detection result or the number of frames between the target frame corresponding to the detection result and the target frame corresponding to a previous detection result of the detection result.

If the detection result corresponding to the target frame satisfies the condition, the processing device may perform operation 1240. If the detection result corresponding to the target frame does not satisfy the condition, the processing device may discard (or delete) the target frame and further perform operation 1210 to process a next target frame in the one or more target frames in the video stream.

In 1240, the processing device (e.g., the processing device 112 illustrated in FIG. 1) (e.g., the second determination module 230 illustrated in FIG. 2) may determine the analysis result of the video stream based on the detection result corresponding to the target frame. The analysis result of the video stream may include the target frame, the occurrence region of the event involved in the target frame, a type of the event, and/or the target probability corresponding to the event. Further, the processing device may output the analysis result of the video stream and/or store the analysis result of the video stream in a storage device (e.g., the storage device 140) disclosed elsewhere in the present disclosure.

According to some embodiments in the present disclosure, the detection result corresponding to the target frame is processed by operations 1210-1230, which reduces the duplication of the determined analysis result and improves the accuracy of the video analysis.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:

at least one storage device including a set of instructions; and at least one processor in communication with the at least one storage device, wherein when executing the set of instructions, the at least one processor is directed to perform operations including:

obtaining a video stream;

for each of a plurality of frames in the video stream, determining a reference score corresponding to each of the plurality of frames based on a spatiotemporal feature of the each of the plurality of frames, wherein the spatiotemporal feature of each of the plurality of frames associates a feature of the frame with a feature of at least one adjacent frame of each of the plurality of frames, and the determining the reference score corresponding to each of the plurality of frames based on the spatiotemporal feature of each of the plurality of frames includes:

determining, using a video analysis model, the reference score corresponding to each of the plurality of frames based on the spatiotemporal feature of each of the plurality of frames, wherein the video analysis model is a trained machine learning model and includes a video analysis network and a plurality of cache units each of which is connected to the video analysis network and configured to cache a same number of frames as a number of frames that are inputted into the video analysis network in a single processing of the video analysis network, the plurality of cache units perform alternating storage and transmission of frame data, and the video analysis network includes:

a feature extraction layer configured to extract features of the plurality of frames in the video stream;

a feature association layer configured to determine the spatiotemporal feature of each of the plurality of frames by associating the feature of each of the plurality of frames with the feature of the at least one adjacent frame of each of the plurality of frames; and a prediction layer configured to determine the reference score corresponding to each of the plurality of frames based on the spatiotemporal feature of each of the plurality of frames;

determining, from the plurality of frames in the video stream, one or more target frames based on reference scores corresponding to the plurality of frames.

2. The system of claim 1, wherein the video analysis network is obtained by a training process including:

obtaining a plurality of sample video streams, wherein each of the plurality of sample video streams involves an abnormal event and includes at least one first frame corresponding to a moment of the abnormal event and a plurality of second frames corresponding to other moments;

for each of the plurality of sample video streams, labeling a plurality of sample frames in each of the plurality of sample video stream, wherein the at least one first frame is labeled with a first score, each of the plurality of second frames is labeled with a second score, and the second score is determined based on a similarity between the at least one first frame and the second frame; and determining the video analysis network by training a preliminary video analysis network based on the plurality of labeled sample video streams.

3. The system of claim 2, wherein the determining the video analysis network by training the preliminary video analysis network based on the plurality of labeled sample video streams includes:

for each of the plurality of labeled sample video streams, determining, using the preliminary video analysis network, a prediction score corresponding to each sample frame in the labeled sample video stream; and determining a loss function based on prediction scores and the labeled scores corresponding to the plurality of sample frames in the labeled sample video stream; and determining the video analysis network by training the preliminary video analysis network based on the plurality of labeled sample video streams and corresponding values of the loss function.

4. The system of claim 3, wherein the determining the loss function based on prediction scores and the labeled scores corresponding to the plurality of sample frames in the labeled sample video stream includes:

for each pair of adjacent sample frames in the plurality of sample frames, determining a first difference of prediction scores corresponding to the pair of adjacent sample frames and a second difference of labeled scores corresponding to the pair of adjacent sample frames;

determining a deviation term based on first differences and second differences corresponding to multiple pairs of adjacent sample frames in the plurality of sample frames, wherein the deviation term indicates a relationship between label scores and prediction scores corresponding to different sample frames in the labeled sample video stream, and reflects a accuracy with which the preliminary video analysis network recognizes differences between different frames; and determining the loss function based on the deviation term and a loss term, wherein the loss term indicates a relationship between a label score and a prediction score corresponding to each of the plurality of sample frame in the labeled sample video stream, and indicates an accuracy of a score prediction determined based on the preliminary video analysis network.

5. The system of claim 1, wherein the video analysis network is obtained by a training process including:

constructing the feature extraction layer in the video analysis network by a transfer learning; and determining the feature association layer and the prediction layer by training a preliminary feature association layer and a preliminary prediction layer based on a plurality of labeled sample video streams.

6. The system of claim 1, wherein for each of the plurality of frames in the video stream, the determining the reference score corresponding to each of the plurality of frames based on the spatiotemporal feature of each of the plurality of frames includes:

determining an analysis region in the video stream; and for each of the plurality of frames in the video stream, determining the reference score corresponding to each of the plurality of frames based on the spatiotemporal feature of a portion of each of the plurality of frames n the analysis region.

7. The system of claim 1, wherein the determining, from the plurality of frames in the video stream, the one or more target frames based on the reference scores corresponding to the plurality of frames includes:

for each of the plurality of frames in the video stream, determining whether the reference score corresponding to each of the plurality of frames is larger than a first threshold;

in response to determining that the reference score corresponding to each of the plurality of frames is larger than the first threshold, determining a similarity degree between each of the plurality of frames and a previous frame of each of the plurality of frames;

determining whether the similarity degree is less than a second threshold; and in response to determining that the similarity degree is less than the second threshold, designating each of the plurality of frames as a target frame.

8. The system of claim 1, wherein the operations further include:

for each of the one or more target frames, determining, using a detection model, a detection result based on the target frame, wherein the detection result includes at least one of an occurrence region, in the target frame, of an event involved in the target frame or a probability that a type of the event is the same as a type of at least one abnormal event; and determining an analysis result of the video stream based on detection results corresponding to the one or more target frames.

9. The system of claim 8, wherein the determining the analysis result of the video stream based on the detection results corresponding to the one or more target frames includes:

for each of the one or more target frames, determining whether a center of the occurrence region of the event associated with the target frame is located in an analysis region in the video stream;

in response to determining that the center of the occurrence region of the event associated with the target frame is located in the analysis region in the video stream, determining whether the probability is larger than a probability threshold associated with the at least one abnormal event;

in response to determining that the probability is larger than the probability threshold associated with the at least one abnormal event, determining whether the occurrence region of the event associated with the target frame satisfies a condition; and in response to determining that the detection result corresponding to the target frame satisfies the condition, determining the analysis result of the video stream based on the detection result corresponding to the target frame.

10. The system of claim 9, wherein the condition includes:

an intersection-over-union (IOU) of the occurrence region of the event in the detection result corresponding to the target frame and an occurrence region of the event in a candidate detection result in the detection results corresponding to the one or more target frames is less than a third threshold, wherein the candidate detection result is determined before the detection result and a probability in the candidate detection result is same as the probability in the detection result; or an interval between the target frame corresponding to the detection result and a target frame corresponding to a previous detection result of the detection result is larger than an interval threshold.

11. A method for video analysis, comprising:

obtaining a video stream;

for each of a plurality of frames in the video stream, determining a reference score corresponding to each of the plurality of frames based on a spatiotemporal feature of each of the plurality of frames, wherein the spatiotemporal feature of each of the plurality of frames associates a feature of each of the plurality of frames with a feature of at least one adjacent frame of each of the plurality of frames, and the determining the reference score corresponding to each of the plurality of frames based on the spatiotemporal feature of each of the plurality of frames includes:

determining, using a video analysis model, the reference score corresponding to each of the plurality of frames based on the spatiotemporal feature of each of the plurality of frames, wherein the video analysis model is a trained machine learning model; and determining the video analysis network by training a preliminary video analysis network based on a plurality of labeled sample video streams, including:

for each of the plurality of labeled sample video streams, determining, using the preliminary video analysis network, a prediction score corresponding to each sample frame in the labeled sample video stream; and determining a loss function based on prediction scores and the labeled scores corresponding to a plurality of sample frames in the labeled sample video stream, including:

for each pair of adjacent sample frames in the plurality of sample frames, determining a first difference of prediction scores corresponding to the pair of adjacent sample frames and a second difference of labeled scores corresponding to the pair of adjacent sample frames;

determining a deviation term based on first differences and second differences corresponding to multiple pairs of adjacent sample frames in the plurality of sample frames, wherein the deviation term indicates a relationship between label scores and prediction scores corresponding to different sample frames in the labeled sample video stream, and reflects an accuracy with which the preliminary video analysis network recognizes differences between different frames; and determining the loss function based on the deviation term and a loss term, wherein the loss term indicates a relationship between a label score and a prediction score corresponding to each of the plurality of sample frame in the labeled sample video stream, and indicates an accuracy of a score prediction determined based on the preliminary video analysis network; and determining the video analysis network by training the preliminary video analysis network based on the plurality of labeled sample video streams and corresponding values of the loss function;

determining, from the plurality of frames in the video stream, one or more target frames based on reference scores corresponding to the plurality of frames.

12. The method of claim 11, wherein the video analysis model includes a video analysis network including:

a feature extraction layer configured to extract features of the plurality of frames in the video stream;

a feature association layer configured to determine the spatiotemporal feature of each of the plurality of frames by associating the feature of each of the plurality of frames with the feature of the at least one adjacent frame of each of the plurality of frames; and a prediction layer configured to determine the reference score corresponding to each of the plurality of frames based on the spatiotemporal feature of each of the plurality of frames.

13. The method of claim 12, wherein the plurality of labeled sample video streams are obtained according to operations including:

obtaining a plurality of sample video streams, wherein each of the plurality of sample video streams involves an abnormal event and includes at least one first frame corresponding to a moment of the abnormal event and a plurality of second frames corresponding to other moments; and for each of the plurality of sample video streams, labeling a plurality of sample frames in each of the plurality of sample video stream, wherein the at least one first frame is labeled with a first score, each of the plurality of second frames is labeled with a second score, and the second score is determined based on a similarity between the at least one first frame and the second frame.

14. A non-transitory computer readable medium, comprising executable instructions that, when executed by at least one processor, direct the at least one processor to perform a method, the method comprising:

obtaining a video stream;

for each of a plurality of frames in the video stream, determining a reference score corresponding to each of the plurality of frames based on a spatiotemporal feature of each of the plurality of frames, wherein the spatiotemporal feature of each of the plurality of frames associates a feature of each of the plurality of frames with a feature of at least one adjacent frame of each of the plurality of frames, and the determining the reference score corresponding to each of the plurality of frames based on the spatiotemporal feature of each of the plurality of frames includes:

determining, using a video analysis model, the reference score corresponding to each of the plurality of frames based on the spatiotemporal feature of each of the plurality of frames, wherein the video analysis model is a trained machine learning model and includes a video analysis network and a plurality of cache units each of which is connected to the video analysis network and configured to cache a same number of frames as a number of frames that are inputted into the video analysis network in a single processing of the video analysis network, the plurality of cache units perform alternating storage and transmission of frame data, and the video analysis network includes:

a feature extraction layer configured to extract features of the plurality of frames in the video stream;

a feature association layer configured to determine the spatiotemporal feature of each of the plurality of frames by associating the feature of each of the plurality of frames with the feature of the at least one adjacent frame of each of the plurality of frames; and a prediction layer configured to determine the reference score corresponding to each of the plurality of frames based on the spatiotemporal feature of each of the plurality of frames;

determining, from the plurality of frames in the video stream, one or more target frames based on reference scores corresponding to the plurality of frames.

* * * * *